(12) United States Patent
Hanson et al.

(10) Patent No.: US 11,787,141 B2
(45) Date of Patent: Oct. 17, 2023

(54) METHOD AND SYSTEM FOR MANUFACTURING A SHOE

(71) Applicant: adidas AG, Herzogenaurach (DE)

(72) Inventors: Henry Hanson, Herzogenaurach (DE); Nicholas Groeneweg, Portland, OR (US); Thomas Feix, Herzogenaurach (DE); Stefan Egerer, Puschendort (DE)

(73) Assignee: adidas AG, Herzogenaurach (DE)

( * ) Notice: Subject to any disclaimer, the term of this patent is extended or adjusted under 35 U.S.C. 154(b) by 551 days.

(21) Appl. No.: 16/518,380

(22) Filed: Jul. 22, 2019

(65) Prior Publication Data

US 2020/0023600 A1  Jan. 23, 2020

(30) Foreign Application Priority Data

Jul. 23, 2018 (DE) .................. 102018212228.8

(51) Int. Cl.
*B29D 35/00* (2010.01)
*B29D 35/12* (2010.01)
(Continued)

(52) U.S. Cl.
CPC .......... *B29D 35/0063* (2013.01); *A43B 13/04* (2013.01); *B29C 33/3821* (2013.01);
(Continued)

(58) Field of Classification Search
CPC ............ B29C 33/3821; B29C 33/3857; B29C 33/308; B29C 33/38; B29C 65/7841; B29C 65/7844; B29C 33/321; B29D 35/12; B29D 35/128; A43D 23/025; A43D 95/14; A43D 8/16; A43D 8/22; A43D 8/24; A43D 2200/10; B41F 17/001; B41F 17/005; B41F 17/002; B41F 17/003; B41F 17/006; B41F 17/14; B41F 17/16; B41F 17/18; B41F 17/38; B41F 15/18; B41F 15/30;
(Continued)

(56) References Cited

U.S. PATENT DOCUMENTS 2,463,672 A * 3/1949 Baker .................... A43D 23/02
  12/127
2,472,754 A * 6/1949 Mead .................. B29C 33/3821
  264/517
(Continued)

FOREIGN PATENT DOCUMENTS

CN 205736063 11/2016
DE 2840188 3/1980
(Continued)

OTHER PUBLICATIONS

ASTM D 2487-06, Standard Practice for Classification of Soils for Engineering Purposes (Year: 2006).*
(Continued)

*Primary Examiner* — Seyed Masoud Malekzadeh
*Assistant Examiner* — Jennifer L Groux
(74) *Attorney, Agent, or Firm* — Kilpatrick Townsend & Stockton LLP (57) ABSTRACT

Described are methods, systems, and devices for at least partly manufacturing a piece of apparel (e.g., a shoe), which incorporate manipulating at least one component of the piece of apparel with a particle jamming device.

19 Claims, 6 Drawing Sheets

(51) Int. Cl.
*A43B 13/04* (2006.01)
*B29C 33/38* (2006.01)
*B41J 3/407* (2006.01)
*B29K 75/00* (2006.01)
*B29K 77/00* (2006.01)
*B29K 96/04* (2006.01)
*B29K 105/04* (2006.01)
*B29K 105/00* (2006.01)

(52) U.S. Cl.
CPC ........ *B29D 35/122* (2013.01); *B41J 3/40731* (2020.08); *B29K 2075/00* (2013.01); *B29K 2077/00* (2013.01); *B29K 2096/04* (2013.01); *B29K 2105/04* (2013.01); *B29K 2105/251* (2013.01)

(58) Field of Classification Search
CPC .. B41J 3/4073; B41J 3/40731; B25J 15/0023; A43B 3/0078; B41P 2217/60; B41P 2217/62; B23Q 3/061; B23Q 3/062; B23Q 3/065; B23Q 3/082; B23Q 3/088
See application file for complete search history.

(56) References Cited

U.S. PATENT DOCUMENTS

| | | | | |
|---|---|---|---|---|
| 2,743,483 A * | 5/1956 | Parini | ................... | B29D 35/06 264/572 |
| 3,962,395 A * | 6/1976 | Hagglund | ................ | A43B 7/28 264/517 |
| 6,398,992 B1 * | 6/2002 | Jacobson | ............ | B29C 33/3821 264/108 |
| 2005/0035477 A1 * | 2/2005 | Jacobson | ............ | B29C 33/3821 264/108 |
| 2010/0326591 A1 * | 12/2010 | Langvin | ................. | A43B 23/24 156/230 |
| 2012/0175813 A1 * | 7/2012 | Leedy | ..................... | B30B 15/34 264/293 |
| 2012/0280421 A1 * | 11/2012 | Keating | ................. | F16B 4/002 264/227 |
| 2013/0106127 A1 | 5/2013 | Lipson et al. | | |
| 2014/0178520 A1 * | 6/2014 | Borland | ................. | B29C 35/04 425/453 |
| 2014/0310890 A1 * | 10/2014 | Miller | ................. | A43B 3/0084 12/123 |
| 2015/0101134 A1 * | 4/2015 | Manz | .................... | A43D 95/00 12/142 R |
| 2015/0202861 A1 * | 7/2015 | Baggen | ................. | B41F 17/005 101/127 |
| 2015/0336227 A1 * | 11/2015 | McKay | ................ | B65D 81/113 29/559 |
| 2018/0281465 A1 * | 10/2018 | Liu | ........................ | B41J 3/4073 |

FOREIGN PATENT DOCUMENTS

| | | | |
|---|---|---|---|
| DE | 112011101331 | 1/2013 | |
| DE | 102011110054 | 2/2013 | |
| DE | 102013108053 | 1/2015 | |
| DE | 102013221018 | 4/2015 | |
| DE | 102013221020 | 4/2015 | |
| DE | 102015225148 | 6/2017 | |
| EP | 2786670 | 10/2014 | |
| FR | 2649916 | 1/1991 | |
| GB | 2260511 A * | 4/1993 | ......... B29C 33/3821 |
| KR | 200362070 Y1 * | 9/2004 | |
| WO | 2006082100 | 8/2006 | |
| WO | 2015123128 | 8/2015 | |
| WO | 2018140616 | 8/2018 | |

OTHER PUBLICATIONS

Jurca et al., Analysis of 1.2 million foot scans from North America, Europe and Asia, www.nature.com/scientificreports (Year: 2019).*
Espacenet machine translation of Klare, DE 102011110054 A1, originally published in 2013 (Year: 2013).*
Silica (silicon dioxide). M. Clugston, The Penguin dictionary of science (4th ed.). Penguin. (Year: 2014).*
Chinese Application No. 201910664998.8, Office Action dated Oct. 15, 2021, 14 pages (English machine translation provided).
Van Hecke, M., "Jamming of soft particles: geometry, mechanics, scaling and isostaticity", Journal of Physics: Condensed Matter, vol. 22, No. 3, Dec. 2009.
European Application No. 19187789.3, Extended European Search Report, dated Dec. 4, 2019, 9 pages.
German Patent Application No. 102018212228.8, Office Action dated Mar. 4, 2019, 14 pages (English machine translation provided).
European Patent Application No. 19187789.3, Office Action dated Aug. 31, 2020, 6 pages.
European Application No. 19187789.3, Office Action dated May 20, 2021, 5 pages.
Chinese Application No. 201910664998.8, Office Action dated Mar. 24, 2021, 17 pages (English machine translation provided).
Chinese Patent Application No. 201910664998.8, Office Action dated Mar. 18, 2022, 13 pages (English machine translation provided).
German Patent Application No. 102018212228.8, Office Action dated Mar. 23, 2022, 9 pages (English machine translation provided).

* cited by examiner

METHOD AND SYSTEM FOR MANUFACTURING A SHOE

CROSS REFERENCE TO RELATED APPLICATION

This application is related to and claims priority benefits from German Patent Application No. DE 10 2018 212 228.8, filed on Jul. 23, 2018, entitled "METHOD AND SYSTEM FOR MANUFACTURING A SHOE" ("the '228 application"). The '288 application is hereby incorporated herein in its entirety by this reference.

FIELD OF THE INVENTION

The present invention relates to methods, systems and devices related to manufacturing a piece of apparel and in particular a shoe.

BACKGROUND

Conventional methods for manufacturing apparel and shoes in particular generally involve manufacturing and/or processing various components such as shoe soles, shoe uppers, and reinforcing elements wherein the various manufacturing steps may be executed at a plurality of processing stations of a manufacturing plant. A wide range of manufacturing methods and/or tools may be needed to produce, process, join, assemble, modify, dye, translate, rotate, fix, deform, etc. said components. The involved components may have widely varying materials with diverse physical properties. Moreover, some of the components or intermediate products may exhibit complex and flexible three-dimensional shapes which may complicate their handling and further processing.

As a consequence, conventional manufacturing methods for the production of apparel such as shoes are cost and labor intensive. More specifically, the multitude of the different manufacturing steps outlined above still poses substantial hurdles for process automatization.

To overcome some of the above disadvantages applicant disclosed already in DE 10 2013 221 018 A1 and in DE 10 2013 221 020 A1 various methods and apparatuses for producing a plurality of shoes. For example, one method includes several steps performed at different processing stations which are connected by conveyer belts. The disclosed methods process shoe components such as three-dimensionally preformed uppers and pre-manufactured soles for eventually assembling the complete shoe.

Moreover, EP 2 786 670 A1 discloses a method for manufacturing a shoe sole from polymer particles, wherein the individual steps of the method are carried out at various processing stations of a production facility. While the disclosed facility somewhat improves the productivity of the overall process, it concerns only the manufacture of the shoe sole from polymer particles.

A common disadvantage of the disclosed production methods is due to the fact that the various mechanical or electromechanical tools used for translating, rotating, holding in place, molding, joining, deforming and/or transforming the various shoe components are typically constructed from solid materials such as metals, plastics, carbon or similar. As a consequence, when the design, size, shape and/or material of a certain component or the overall shoe is changed and/or adapted for a given manufacturing plant, in general, said manufacturing tools also need to be replaced or adjusted for the new shoe design to be produced before the manufacturing plant can recommence shoe production.

Evidently, such reconfiguration of a given manufacturing plant is in itself time consuming, cost and labor intensive and may require a large stockpile of custom made tools and machinery and/or sophisticated rapid prototyping facilities.

DE 2840188 A1, WO 2006/082100 A1, US 2013/0106127 A1 and WO 2015/123128 A1 are each directed to grippers for solid objects, wherein the working principle of said grippers is based on the physical effect of particle jamming. The review article "Jamming of soft particles: geometry, mechanics, scaling and isostaticity" published in December 2009 by M. van Hecke in the Journal of Physics: Condensed Matter, Volume 22, Number 3 gives a recent account of the scientific background on said particle jamming.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method may be provided for at least partly manufacturing a piece of apparel including a shoe. The method may include manipulating at least one component of the piece of apparel with a particle jamming device.

In some embodiments, manipulating the at least one component of the piece of apparel with the particle jamming device may include at least one of the following: translating the at least one component of the piece of apparel; rotating the at least one component of the piece of apparel; or holding in place the at least one component of the piece of apparel.

In some embodiments, manipulating the at least one component of the piece of apparel with the particle jamming device may include at least one of the following: compressing the at least one component of the piece of apparel; deforming the at least one component of the piece of apparel; or calendaring the at least one component of the piece of apparel.

In some embodiments, manipulating the at least one component of the piece of apparel with the particle jamming device may include at least one of the following: molding the at least one component of the piece of apparel; forming the at least one component over at least a portion of a surface of the particle jamming device; or capturing a negative relief of at least a portion of the at least one component of the piece of apparel.

In some embodiments, manipulating the at least one component of the piece of apparel with the particle jamming device may include molding the at least one component of the piece of apparel by a process that comprises: filling a mold volume confined at least in part by a portion of the particle jamming device with a plurality of polymer particles; and forming the at least one component of the piece of apparel by permanently connecting at least partly the surfaces of the polymer particles.

In some embodiments, permanently connecting at least partly the surfaces of the polymer particles may include at least one of the of: applying heat to the polymer particles; applying an adhesive to the polymer particles; or applying electromagnetic radiation to the polymer particles.

In some embodiments, the at least one component of the piece of apparel is a portion or all of at least one of: a shoe upper, an insole, a midsole, a reinforcing element, or an outsole.

In some embodiments, the particle jamming device may include: a flexible outer surface forming a cavity, and a plurality of particles within the cavity. The plurality of particles may be adapted to jam when a volume of the cavity is reduced.

In some embodiments, the flexible outer surface comprises at least one of a polymer, a latex, a silicone, or a rubber material.

In some embodiments, a ratio between the volume of the cavity and an average volume of a particle from the plurality of particles is larger than 20, larger than 50, or larger than 100.

In some embodiments, the particles of the plurality of particles have essentially an ellipsoid shape and the average aspect ratio of a particle from the plurality of particles is larger than 1, larger than 1.5, or larger than 2.

According to certain embodiments of the present invention, a particle jamming device may be provided for the manufacture of a piece of apparel. The particle jamming device may be adapted to provide at least a portion of a mold, of an actuator, or of a reference body for at least a component of the piece of apparel. The particle jamming device may include: a flexible outer surface forming a cavity, and a plurality of particles within the cavity. The plurality of particles may be adapted to jam when a volume of the cavity is reduced.

In some embodiments, the flexible outer surface and/or the plurality of particles is heat resistant up to at least a temperature of 200° C.

In some embodiments, the plurality of particles may include at least one of a polymer material, a ceramic material, an organic material, a metal, or a mineral.

In some embodiments, the flexible outer surface may include at least one of a polymer, a latex, a silicone, or a rubber material.

In some embodiments, the ratio between the volume of the cavity and an average volume of a particle from the plurality of particles is larger than 20, larger than 50, or larger than 100.

In some embodiments, the particles of the plurality of particles have essentially an ellipsoid shape and the average aspect ratio of a particle from the plurality of particles is larger than 1, larger than 1.5, or larger than 2.

In some embodiments, the particle jamming device may include at least one of: a shoe last as the reference body; a particle foam mold for molding soles as the mold; an adaptable base plate; or an adaptive morph pad as the actuator.

According to certain embodiments of the present invention, a method is provided for obtaining a negative relief of an object or surface. The method may include, at least partly covering the object or surface with at least a portion of a particle jamming device. The portion of the particle jamming device may include a flexible outer surface forming a cavity. The cavity may be filled with a plurality of particles adapted to jam when the volume of the cavity is reduced. The method may further include capturing the negative relief of the object or surface by reducing the volume of the cavity.

In some embodiments, a method for manufacturing a non-woven fabric is provided. The method may include obtaining a negative relief of an object or surface, such as by actions described above. The method may further include depositing a plurality of fibers on at least a portion of the surface of the negative relief. The method may further include forming the non-woven fabric by connecting at least partly the deposited plurality of fibers.

BRIEF DESCRIPTION OF THE DRAWINGS

In the following detailed description, embodiments of the invention are described referring to the following figures:

FIG. 1-*a* is a schematic drawing illustrating an application of a particle jamming device as an adaptable base plate usable during shoe manufacturing according to various embodiments.

FIG. 1-*b* is a schematic drawing illustrating an application of a particle jamming device as an adaptive morph pad usable during shoe manufacturing according to various embodiments.

FIG. 1-*c* is a schematic drawing illustrating an application of a particle jamming device as an adaptive morph pad usable during shoe manufacturing according to various embodiments.

FIG. 4-*a* is a schematic drawing illustrating an application of a particle jamming device as an adaptable reference body for producing a non-woven fabric usable during apparel manufacturing according to various embodiments.

FIG. 4-*b* is a schematic drawing illustrating an application of a particle jamming device as an adaptable reference body for producing a non-woven fabric usable during apparel manufacturing according to various embodiments.

FIG. 4-*c* is a schematic drawing illustrating an application of a particle jamming device as an adaptable reference body for producing a non-woven fabric usable during apparel manufacturing according to various embodiments.

BRIEF DESCRIPTION

In some embodiments, a method is provided for at least partly manufacturing a piece of apparel and in particular a shoe, comprising manipulating at least one component of the piece of apparel with a particle jamming device.

For instance, manipulating the at least one component of the piece of apparel with the particle jamming device may comprise at least one of the following steps of: translating the at least one component of the piece of apparel, rotating the at least one component of the piece of apparel, and holding in place the at least one component of the piece of apparel.

Thus, particle jamming devices may be used for executing and/or facilitating various processing steps during apparel manufacturing. For example, particle jamming devices may be used to form adaptable and/or reconfigurable shoe manufacturing tools.

An example may be an adaptable surface that could be configured by the respective shoe component itself or by a separate template. The adaptable surface may be used as an adaptable support plate or even a gripper for mounting, translating, and rotating the component during a process that may serve to join the respective shoe component to a different component of the shoe. Due to the adaptability of the particle jamming device, there is no longer a need for special adaptation to the specific size and/shape of the component. Rather, the particle jamming device will more or less automatically adapt to the contour of the component to be manipulated. As may be appreciated, in various embodiments, tremendous efficiency gain may be obtainable by using particle jamming devices for the manufacture of shoe components or shoes, as to date no other technology provides such an amount of flexibility to adapt to different surface structures, shapes, materials, etc.

Further, manipulating the at least one component of the piece of apparel with the particle jamming device may comprise at least one of the following steps: compressing the at least one component of the piece of apparel, deforming the at least one component of the piece of apparel, and calendaring the at least one component of the piece of apparel.

For instance, several processing steps during shoe manufacturing may involve pressing a sheet of material onto a curved surface and/or pressing two different sheets of material onto each other by using a potentially curved surface as counter surface. A pressing tool or apparatus that makes use of a particle jamming device may ensure that the respective sheets of material are pressed and/or compacted by a more homogenous compacting pressure exerted onto the respective curved surface.

Further, manipulating the at least one component of the piece of apparel with the particle jamming device may comprise at least one of the following steps: molding the at least one component of the piece of apparel, forming the at least one component over at least a portion of the surface of the particle jamming device, and capturing a negative relief of at least a portion of the at least one component of the piece of apparel.

For instance, if manipulating the at least one component of the piece of apparel comprises molding the at least one component of the piece of apparel, said step of molding may comprise filling a mold volume confined at least in part by a portion of the particle jamming device with a plurality of polymer particles and forming the at least one component of the piece of apparel by permanently connecting at least partly the surfaces of the polymer particles. Said permanently connecting at least partly the surfaces of the polymer particles may comprise for example applying heat and/or an adhesive/and or electromagnetic radiation to the polymer particles.

More generically, a particle jamming device may be used to design readily reconfigurable molds for molding apparel components. This is an important benefit compared to conventional techniques wherein any change to the mold, even if the most advance rapid prototyping methods are used, still leads to considerable downtime of the overall manufacturing process.

In some embodiments, the at least one component of the piece of apparel may be a shoe upper, an insole, a midsole, a reinforcing element, and/or an outsole of the shoe.

In some embodiments, the particle jamming device may comprise a flexible outer surface forming a cavity, wherein the cavity may comprise a plurality of particles, and wherein the plurality of particles may be adapted to jam when the volume of the cavity is reduced.

For instance, the particle jamming device may comprise a cavity that is bordered by an outer surface made from a flexible polymer or rubber material and wherein the cavity is filled with a plurality of polymer or ceramic beads whose average volume is substantially smaller than the volume of the cavity. Naturally, a multitude of different particles having a multitude of different shapes, sizes, materials, and/or geometries may be used for the plurality of particles adapted to jam when the volume of the cavity is reduced. In particular, said parameters of the particles may be adapted to the respective processing step during apparel manufacture in which the respective particle jamming device is being involved. The cavity may further comprise an opening through which air may be sucked out of the cavity resulting in a reduction of the volume of the cavity forcing the beads or particles within to contact each other, to increase the friction between each other, and eventually to jam when the volume of the cavity is reduced below a certain threshold.

For some embodiments, the flexible outer surface of the jamming device may be heat resistant up to a temperature of 200° C.—a temperature, for example, corresponding to a temperature associated with saturated steam of H2O in a pressure range used for instance during molding of midsoles comprising polymer particles.

Further, the plurality of particles may comprise a polymer material, a ceramic material, an organic material, a metal, and/or a mineral depending on the application and/or processing steps and/or processing parameters (e.g. processing temperature) and/or manufacturing materials etc. employed during apparel manufacturing.

Further, the flexible outer surface may comprise a polymer, latex, silicone, and/or a rubber material, depending on the application and/or processing steps and/or processing parameters (e.g. processing temperature) and/or manufacturing materials etc. employed during apparel manufacturing.

Further, the ratio between the volume of the cavity and the average volume of a particle from the plurality of particles may be larger than 20 in some embodiments, or larger than 50 in various embodiments, or larger than 100 in many embodiments in order to achieve a sufficient spatial resolution of the particle jamming device.

Further, the particles of the plurality of particles may have essentially an ellipsoid shape, and the average aspect ratio of a particle from the plurality of particles may be larger than 1, or larger than 1.5, or larger than 2 in order to optimize jamming in the jammed configuration and/or rearrangement of the particles in the non-jammed configuration.

Some embodiments provide a system for at least partly manufacturing a piece of apparel, comprising a particle jamming device, wherein the particle jamming device is adapted for manipulating at least one component of the piece of apparel.

In particular, such system may be adapted to perform a method according to any of the above discussed embodiments.

For instance, such systems may comprise various subsystems/components such as vacuum pumps used for sucking out the air of one or several cavities comprising an elastic outer surface, wherein the respective cavities may perform various tasks and/or may be involved in various processing steps during manufacturing of a piece of apparel. For example, said systems may further comprise a plurality of sensors, actuators, controllers, computers, connectors, hoses etc. and may employ and/or involve at least one particle jamming device to perform processing steps during apparel manufacturing such as translating, rotating, holding, molding, and/or deforming of apparel components etc.

In further embodiments, a particle jamming device is provided for the manufacture of a piece of apparel, wherein the particle jamming device may be adapted to provide at least a portion of a mold, of an actuator, and/or of a reference body for at least a component of the piece of apparel, wherein the particle jamming device may comprise a flexible outer surface forming a cavity, wherein the cavity comprises a plurality of particles, and wherein the plurality of particles is adapted to jam when the volume of the cavity is reduced.

For instance, such particle jamming device may be adapted to provide a portion of a mold for molding a particle foam part such as a midsole comprising fused polymer particles. Such mold may in turn be adapted to exert a reconfigurable pressure onto the molded part during molding and/or may be adapted to exhibit a reconfigurable shape, wherein the pressure and/or shape may be reconfigured/adapted by the particle jamming device.

In some embodiments, the flexible outer surface of the particle jamming device may be heat resistant up to a temperature of 200° C., e.g., a temperature that may be of relevance for particle foam molding of polymer parts.

Further, the above particle jamming device may comprise a shoe last as the reference body for the component of the piece of apparel. In particular, said shoe last may be reconfigurable by the particle jamming device.

Further, the above particle jamming device may comprise a particle foam mold for molding soles as the mold for the component of the piece of apparel. In particular, said particle foam mold may be reconfigurable by the particle jamming device.

Further, the above particle jamming device may comprise an adaptable base plate as the actuator for the component of the piece of apparel. In particular, said particle foam mold may be reconfigurable by the particle jamming device.

For instance, a programmable pin mold may be used to imprint a programmable shape onto the shoe last prior to jamming of the particles. The jamming effect may then be used to temporary conserve said imprinted shape provided by the programmable pin mold for use during subsequent shoe manufacturing steps that involve a shoe last. In this way, the need for a large stockpile of different shoe lasts may be reduced significantly.

In some embodiments, a method is provided for obtaining a negative relief of an object or surface, comprising covering at least one portion of the object with portion of a particle jamming device wherein the portion of the particle jamming device comprises a flexible outer surface forming a cavity wherein the cavity is filled with a plurality of particles adapted to jam when the volume of the cavity is reduced, and capturing the negative relief of the at least one portion of the object by reducing the volume of the cavity.

For instance, the above method for obtaining a negative relief may be used in a method for manufacturing of non-woven fabrics used for apparel manufacturing, wherein said method comprises obtaining a negative relief of an object or surface by the above method, depositing a plurality of fibers on at least a portion of the surface of the negative relief and forming the non-woven fabric by connecting at least partly the deposited plurality of fibers.

For example, in this way a non-woven fabric may be produced that precisely fits to the complex surface geometry of certain apparel components and/or template bodies.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, exemplary embodiments of the present invention are described in more detail, with reference to processes, systems, devices and tools usable during apparel and in particular shoe manufacturing. While specific feature combinations are described in the following with respect to the exemplary embodiments of the present invention, it is to be understood that the disclosure is not limited to such embodiments. In other words, not all features have to be present for realizing the invention, and the embodiments may be modified by combining certain features of one embodiment with one or more features of another embodiment.

Figure 1A:
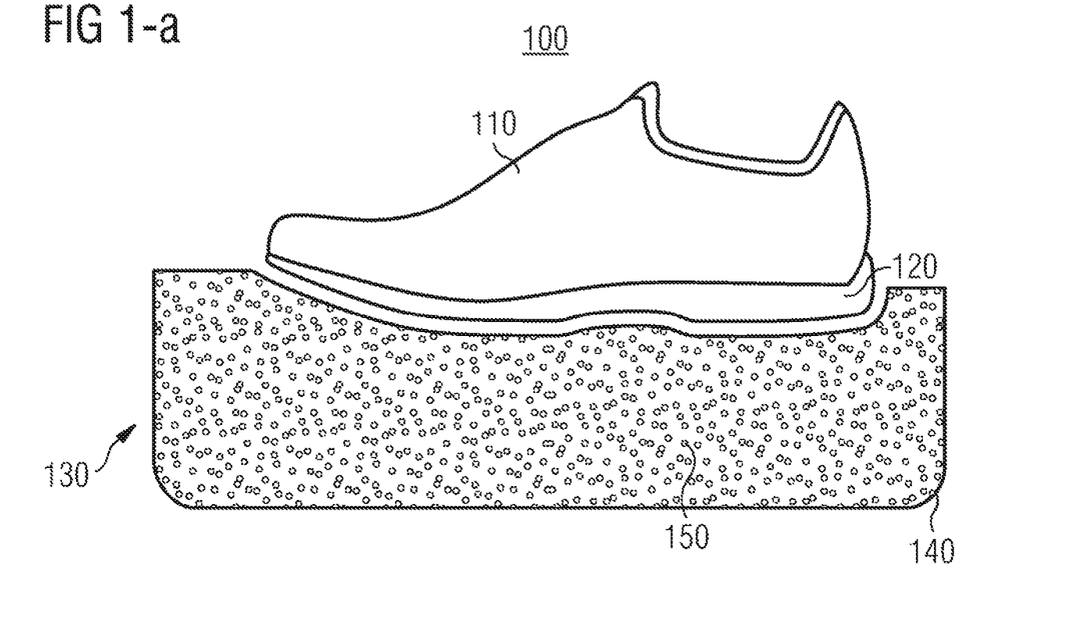

FIG. 1-$a$ illustrates an application of a particle jamming device providing an adaptable base plate 130 usable during shoe manufacturing. For instance, in order to assemble a shoe 100 such as a sport shoe from a sole assembly 120 and a shoe upper 110, it may be required to join said shoe upper 110 with the sole assembly 120 by a joining method such as infrared welding, gluing, etc. In particular, it may be required to precisely position the shoe upper 110 with respect to the sole assembly 120 during assembly in order to successfully perform the joining procedure to ensure a durable bonding between both shoe components 110 and 120.

Since both shoe components—the sole assembly 120 and the shoe upper 110—may comprise flexible materials and/or may exhibit a complex three-dimensional shape, the actuators used for handling and positioning both shoe components 110 and 120 during assembly may be adapted to custom fit to at least a portion of the respective shoe component. For instance, the sole assembly 120 may be hold in place by an adaptable base plate 130 that is provided by and/or is a part of a particle jamming device and that may be adapted to custom fit to the lower part of the outer surface of the sole assembly 120. For example, the adaptable base plate 130 may comprise an elastic and/or flexible layer of material as outer surface 140 forming an internal space or cavity at least partially filled with particles 150. In a starting configuration, the volume of the cavity formed by the outer surface 140 of the adaptable base plate 130 is large enough so that the particles 150 can essentially freely move with respect to each other. In this respect and for the remainder of the present application the term "essentially" shall be defined as "within typical design, manufacturing and/or operation tolerances"

As a consequence, the outer surface 140 of the adaptable base plate 130 can custom fit to the geometrical shape and size of the sole assembly 120.

In some embodiments, the geometry, size, and/or material of the particles 150 may vary depending on the intended application of the particle jamming device. For instance, the geometry, shape, size, and/or material of the particles 150 may vary depending on the size, shape, and material of the sole assembly 120 that is to be mounted and/or manipulated by a portion of a particle jamming device such as the adaptable base plate 130.

In order to mount the sole assembly 120 on the adaptable base plate 130 provided by the particle jamming device, the volume of the cavity formed by the outer surface 140 may be reduced, resulting in an external force exerted onto the particles 150 inside the cavity. This results in an increase of friction between the particles 150 inside the cavity. Eventually, the friction becomes so large that the particles 150 begin to jam or jam completely, and the outer surface 140 of the adaptable base plate 130 stiffens around the lower portion of the sole assembly 120. This in turn results in an increase of friction between the outer surface 140 of the adaptable base plate 130 and the lower surface of the sole assembly 120 wherein said friction may be sufficient for the sole assembly 120 to be gripped, held in place, moved around, and/or rotated in space by the adaptable base plate 130.

In some embodiments, the adaptable base plate 130 may be a part of a larger particle jamming device which in turn may comprise components for reducing and enlarging the volume of the cavity formed by the outer surface 140 of the adaptable base plate 130. For example, the particle jamming device may comprise vacuum generation components such as a pump connected to the adaptable base plate 130 and adapted to suck out the air or any other gas from the adaptable base plate 130 and thereby reduce the volume of the cavity formed by the outer surface 140. However, in some embodiments, other components adapted for controlling the volume of the cavity formed by the outer surface 140 of the adaptable base plate 130 may also be used. For instance, the volume of the cavity may be controlled by a piston that may be inserted and retracted form the cavity to change the volume of the cavity. Moreover, other components may be adapted to change the surface area of the outer surface 140 for example by releasing and retracting the outer surface 140.

Moreover, the particle jamming device may also comprise components to adjust the number and/or type of particles 150 inside the cavity formed by the outer surface 140 of the adaptable base plate 130. For example, this may be used to adjust the degree of filling of the cavity and/or the material properties of the particles 150 when the size, geometry, and/or the material of the sole assembly 120 is changed from one manufacturing batch to the to the next.

Further, the adaptable base plate 130 may be integrated in a processing station further comprising a conveyor belt and/or other robotic actuators. For example, the adaptable base plate 130 may be mounted on a robotic arm that may be adapted for positioning the sole assembly 120 such in space that the shoe upper 110 may be reliably be joined with the sole assembly 120, for instance by infrared welding, gluing, etc.

Figure 1B:
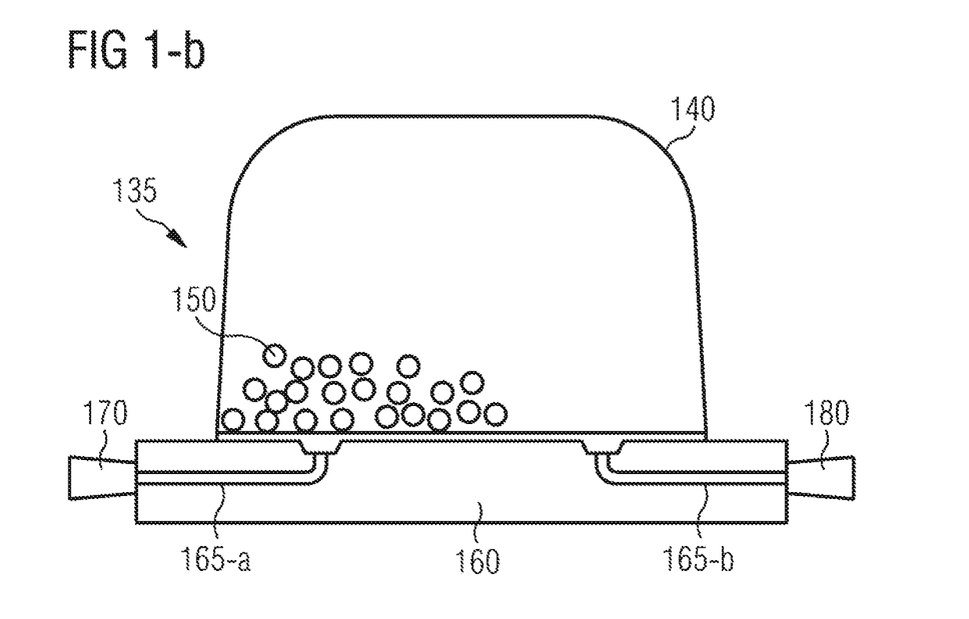

FIG. 1-*b* illustrates a particle jamming device usable during apparel manufacturing and in particular shoe manufacturing according to various embodiments. The particle jamming device can also be designated as an adaptive morph pad 135. In close analogy to the adaptable base plate 130 shown in FIG. 1-*a*, the adaptive morph pad 135 of FIG. 1-*b* comprises an elastic and/or flexible layer of material as outer surface 140 forming an internal space or cavity at least partially filled with particles 150. In a starting configuration the volume of the cavity formed by the outer surface 140 of the adaptive morph pad 135 is large enough so that the particles 150 can essentially freely move with respect to each other.

The outer surface 140 of the adaptive morph pad 135 is connected at the bottom end to a base plate 160 that comprises channels 165 that are adapted to connect the internal space/or cavity with the external space such that air and/or gas may be sucked or pumped out and/or let in or pumped in again through gas outlets 170 and 180 to change the volume of the cavity and thereby reversibly force the particles 150 to jam or to move freely with respect to each other.

For instance, said morph pad may be used as an adaptive support structure during apparel and shoe manufacturing.

Figure 1C:
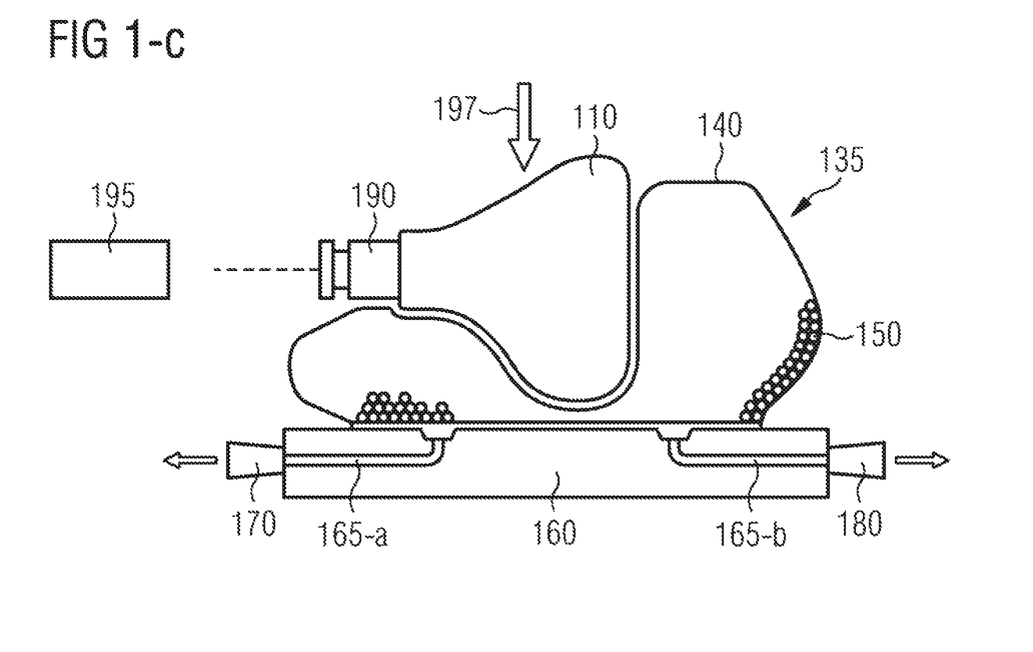

FIG. 1-*c* illustrates an application of such adaptive morph pad 135 during shoe manufacturing. In particular, the adaptive morph pad 135 may be adapted to provide a support structure for a robotic actuator arm 190 that may be actuated by a robot 195. The robotic actuator arm 190 can place a shoe upper 110 that is arranged on the surface of a shoe last onto the adaptive morph pad 135. Prior to jamming, the particles can move essentially freely with respect to each other inside the cavity bounded by the outer surface 140 of the adaptive morph pad 135. In this way, the outer surface can adapt its shape to the shape of the lasted shoe upper 110 and a portion of the robotic actuator arm 190 extending from the lasted shoe upper prior to jamming the particles 150.

When the volume of the cavity is reduced by pumping out gas or air out of the cavity through channels 165-*a* and 165-*b* and outlets 170 and 180, the particles 150 begin to jam and the adaptive morph pad 135 provides an individual support structure to support the lasted shoe upper and the portion of the robotic actuator arm during certain manufacturing steps.

For instance, during a pad printing process, a silicone stamp (indicated by the arrow 197) is pressed onto the lasted shoe upper 110 with a pressing force of up to 2000 N. Without the support provided by the adaptive morph pad 135, the pressing force may cause the robotic actuator arm 190 and/or the robot 195 to bend and/or to deform, thereby adversely affecting the pad printing process. The adaptive morph pad allows that the support for the lasted shoe upper 110 can easily be adjusted and/or adjusts itself to different last shapes and/or shoe shapes and/or shoe sizes following each other in a regular production order.

An exemplary production process may comprise the following steps:

1) A robot 195 presses a lasted shoe upper 110 into the adaptive morph pad.

The robot 195 keeps holding the last.

The particles 150 inside the adaptive morph pad 135 are still able to move freely and the shape of the outer surface 140 is deformable.

Thus, the adaptive morph pad 135 adjusts to the shape of the lasted shoe upper 110.

2) A vacuum is applied through the gas outlets 170, 180 to the inside of the cavity of the adaptive morph pad 135.

As a result, the particles 150 inside the cavity bounded by the outer surface 140 are forced to jam and the adaptive morph pad 135 becomes rigid.

3) A printing machine pushes down (as at arrow 197) its stamp on the lasted upper.

4) The robot 195 removes the lasted shoe upper 110 from the adaptive morph pad 135.

5) Vacuum is switched off and air is let in into the cavity.

6) The particles 150 inside the adaptive morph pad 135 cease to jam and the adaptive morph pad relaxes into its original shape.

Figure 2:
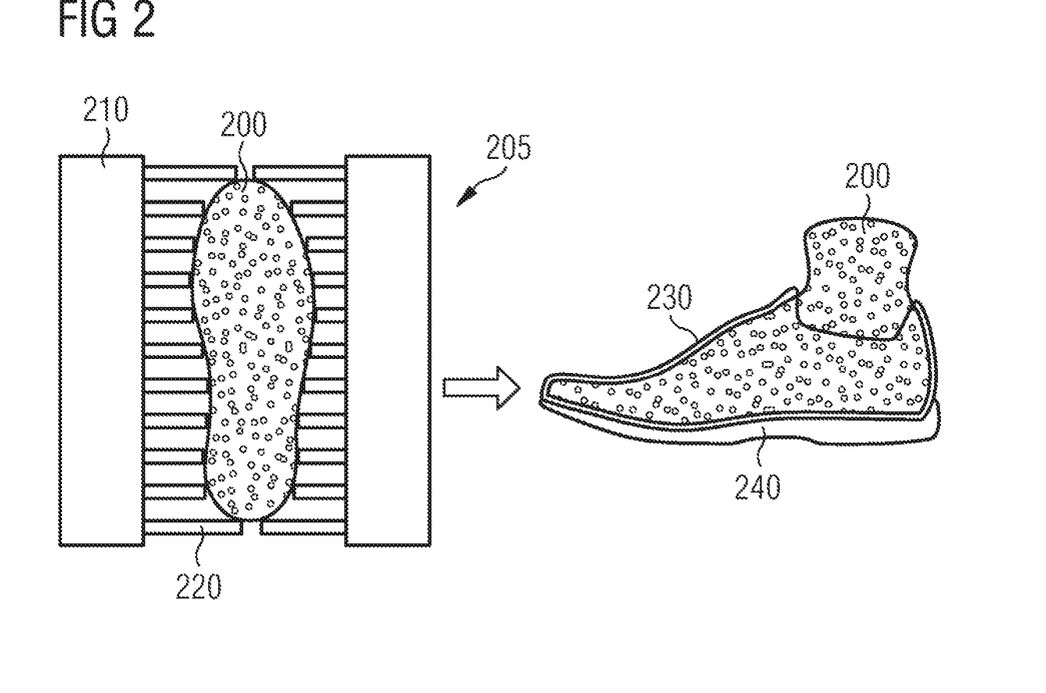
FIG. 2 is a schematic drawing illustrating an application of a particle jamming device as an adaptable shoe last usable during shoe manufacturing according to various embodiments.

FIG. 2 depicts a further application of a particle jamming device as an adaptable shoe last 200 usable during shoe manufacturing. Similar to the adaptable base plate 130 discussed in detail above, said adaptable shoe last 200 may comprise a flexible and/or elastic outer surface that at least partly forms a cavity filled with a plurality of particles adapted to jam when the volume of said cavity is reduced below a certain threshold value.

In some embodiments, a pin mold 205 that may be computer controlled may be used to imprint a predefined shape, size, and/or geometry onto the adaptable shoe last 200. For instance, a plurality of pins 220 may be configured to be repeatedly be protruded and retracted from at least one base plate assembly 210. The base plate assembly 210 may comprise components such as electromechanical actuators to execute said protruding and retracting said plurality of pins 220. For example, said plurality of pins 220 may be protruded and retracted by individual stepper motors housed within the at least one base plate assembly 210 and each configured to control the degree of protrusion of an individual pin of the plurality of pins 220.

In order to imprint a given shape, size and/or geometry onto the adaptable shoe last 200, the adaptable shoe last 200 may be configured in a first, non-jammed configuration such that the particles inside the adaptable shoe last 200 can essentially freely move with respect to each other. As a consequence, the shape, size, and/or geometry of the adaptable shoe last 200 may adapt to the configuration defined by the plurality of pins 220 of the pin mold 205. When the adaptable shoe last 200 has adapted to the pin configuration defined by the plurality of pins 220 of the pin mold 205, the particle jamming device may be used to force the particles inside the adaptable shoe last 200 to jam and thereby to conserve the shape, size, and/or geometry imprinted onto the adaptable shoe last 200 by the pin mold 205.

For instance, the particles inside the adaptable shoe last 200 may be forced to jam by reducing the volume of the adaptable shoe last 200. After the shape, size, and/or geometry imprinted onto the adaptable shoe last 200 by the pin mold 205 is conserved by jamming the particles inside the adaptable shoe last 200, the plurality of pins 220 may be retracted by the actuator of the at least one base plate assembly 210 of the pin mold 205 such that the adaptable shoe last 200 may be removed from the mold volume and be used as a reference body usable for further processing steps during shoe manufacturing requiring and/or profiting from the adaptable shoe last 200.

Additionally or alternatively, the pin mold 205 may be removed from the position around the adaptable shoe last 200, and the adaptable shoe last 200 may remain in its original place for application during further processing steps of the respective shoe manufacturing process.

For instance, such adaptable shoe last 200 may be used during assembly of a shoe comprising a shoe upper 230 and a sole assembly 240. In particular, the adaptable shoe last 200 last may serve as a reference body that provides a template during a processing step used for joining a sole assembly 240 with a shoe upper 230. Additionally or alternatively, the adaptable shoe last 200 last may also serve as a reference body that provides a template during a processing step for plastic deformation of certain shoe components such as a shoe upper 230 and/or a sole assembly 240 arranged on at least a portion of the surface of the adaptable shoe last 200.

In some embodiments, the particle jamming device may be configured to also adjust the number and/or type of particles that are inside the adaptable shoe last 200 when the given shape, size, and/or geometry is being imprinted onto the adaptable shoe last 200 by the pin mold 205.

Figure 3:
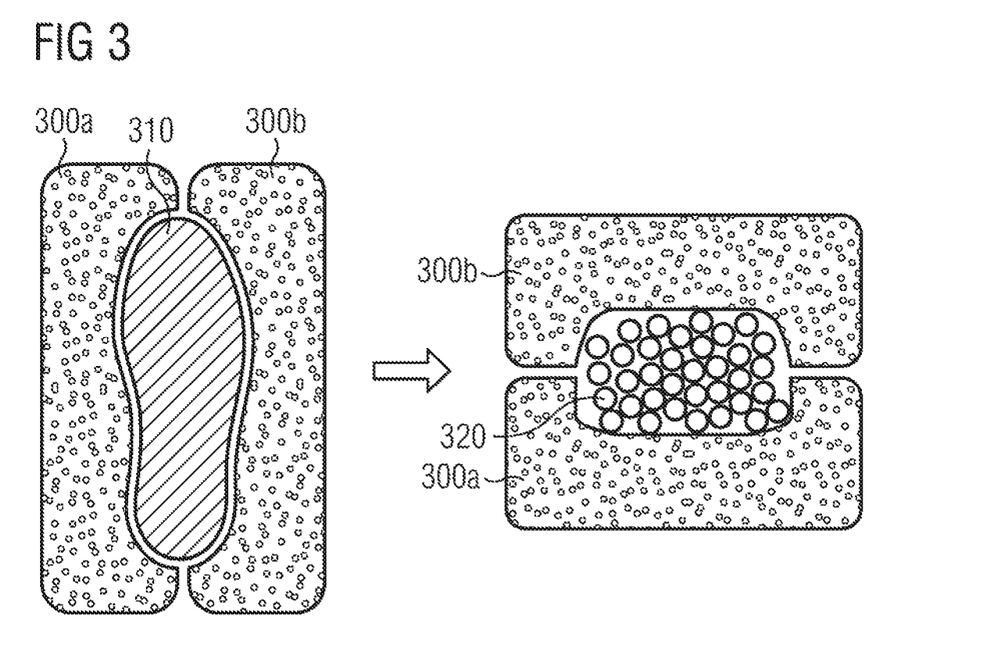
FIG. 3 is a schematic drawing illustrating an application of a particle jamming device as an adaptable mold for forming a particle foam component usable during apparel manufacturing according to various embodiments.

FIG. 3 depicts a further application of a particle jamming device as an adaptable mold 300 for forming a particle foam component usable during shoe manufacturing. Similar to the adaptable base plate 130 and the adaptable shoe last 200 discussed in detail above, said adaptable mold 300 may comprise a flexible and/or elastic outer surface that at least partly forms a cavity filled with a plurality of particles adapted to jam when the volume of said cavity is reduced below a certain threshold value.

For instance, said adaptable mold 300 may comprise at least a first 300a and a second mold portion 300b that may be configured to adapt to the shape, size and/or geometry of a template body 310. Said template body 310 may be, for example, a manufacturing template, for example, produced in a rapid prototyping facility, e.g. by CNC milling and/or additive manufacturing. For example, said template body 310 may be a template for a sole and in particular a midsole of a shoe.

Another exemplary template body 310 may be a body part of a wearer of the shoe to be manufactured.

The particle jamming effect illustrated above with reference to the adaptable shoe last 200 of FIG. 2 may also be used to conserve the shape, size, and/or geometry of the template body 310 by the at least first 300a and second mold portion 300b. After the shape, size, and/or geometry of the template body 310 is conserved, the adaptable mold 300 can then be used for molding a shoe component corresponding to the shape, size, and/or geometry of the template body 310. For instance, the mold 300 may be used for particle foam molding of shoe components such as midsoles comprising a plurality of polymer particles 320 such as expanded thermoplastic polyurethane (eTPU) particles and/or expanded polyether block amide particles (ePEBA) particles and/or any other polymer particles suitable for molding of shoe components and midsoles in particular.

In order to mold a shoe component corresponding to the shape, size, and/or geometry of a given template body 310, the mold volume formed by the at least first 300a and second portion 300b of the adaptable mold 300 may be filled with a plurality of polymer particles 320. After filling is completed or even during filling, the plurality of particles 320 may be permanently connected by permanently connecting at least partly the surfaces of said polymer particles 320, for example, by applying heat and/or by applying an adhesive and/or electromagnetic radiation to said polymer particles.

For example, heat for connecting and/or fusing at least partly the surfaces of the polymer particles 320 may be provided by heated steam (such as saturated H2O steam) and/or by electromagnetic radiation such as radio frequency (RF), microwave (MW), infrared (IR) and/or ultraviolet (UV) radiation.

After the respective process for permanently connecting and/or fusing at least partly the surfaces of the plurality of particles 320 inside the mold volume formed by the mold 300 is essentially completed, the molded shoe component such as a molded midsole may be removed from the mold volume of the adaptable mold 300 and be used for further processing steps of the respective shoe manufacturing process.

Figure 4A:
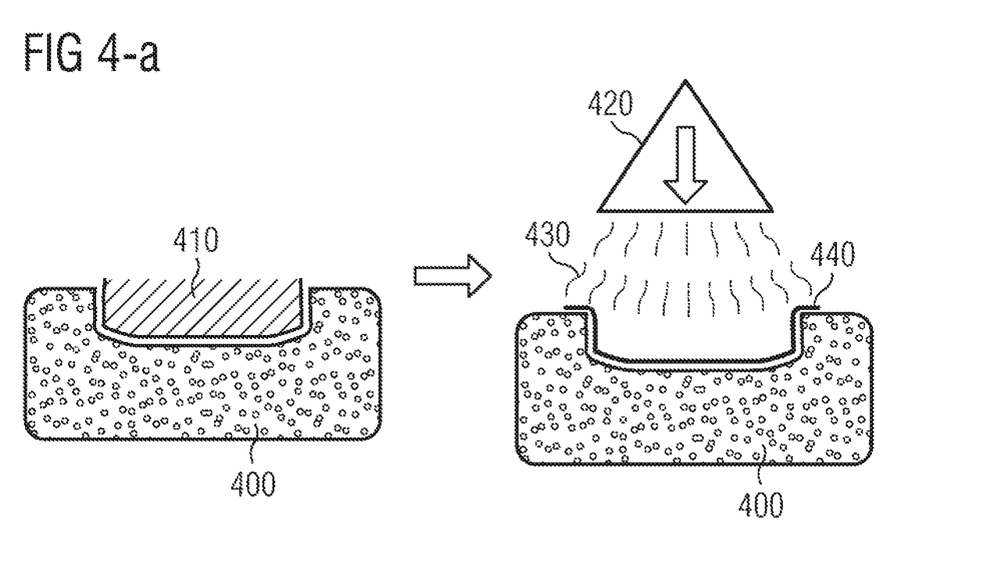

FIG. 4-a depicts a further application of a particle jamming device as an adaptable reference body 400 for producing a non-woven fabric 440 usable during apparel manufacturing. Similar to the adaptable base plate 130, the adaptable shoe last 200, and/or the adaptable mold 300 discussed in detail above, said adaptable reference body 400 for producing a non-woven fabric 440 may comprise a flexible and/or elastic outer surface that at least partly forms a cavity filled with a plurality of particles adapted to jam when the volume of said cavity is reduced below a certain threshold value.

In close analogy to the adaptable mold 300 discussed with reference to FIG. 3 above, a particle jamming device may also provide an adaptable reference body 400 that may be used to obtain a negative relief of a template body 410. In order to do so, the adaptable reference body 400 is first configured in a non-jammed configuration. It is then put over the template body 410 in said non-jammed configuration such that the outer surface of the adaptable reference body custom fits to a least a portion of the surface of the template body 410.

In some embodiments, the material of the outer surface of the adaptable reference body as well as the size, shape, geometry, and/or the material of the jamming particles inside the adaptable reference body 400 may be adapted such that the features of the template body 410 may be resolved with sufficient spatial resolution when the adaptable reference body 400 is put over the template body 410 to custom fit to at least a portion of the template body 410. In particular, the average size of the particles inside the adaptable reference body 400 may be at least smaller than the smallest feature of the surface of the template body 410 to be resolved by the adaptable reference body 400.

Moreover, the deformation properties of the material of the outer surface of the adaptable reference body 400 may be adapted such that the outer surface of the adaptable reference body can resolve the smallest feature of the surface of the template body 410 to be resolved during the process step depicted in FIG. 4.

After the adaptable reference body 400 has obtained a sufficiently precise custom fit to at least a portion of the surface of the template body 410, the particle jamming device can force the particles inside the adaptable reference body 400 to jam and thereby to stiffen the outer surface of the adaptable reference body 400 such that a negative relief of the portion of the surface of the template body 410 is conserved by the adaptable reference body 400 in the jammed configuration. Said jamming may be, for example, induced by reducing the volume of the adaptable reference body 400, such that the friction forces between the particles inside the adaptable reference body 400 exceed a threshold value required for jamming.

When the surface geometry of at least a portion of the template body 410 is conserved by the adaptable reference body 400 by making use of the particle jamming effect, the adaptable reference body 400 may be used itself as a template for further processing steps of the respective shoe manufacturing process. For instance, the negative relief of the at least one portion of the surface of the template body 410 that has been obtained and conserved by the adaptable reference body 400 may be used as a template surface for producing a non-woven fabric 440 that custom fits to the surface of the adaptable reference body 400 in the jammed configuration. In order to produce the non-woven fabric 440, a fiber deposition apparatus 420 may be used to deposit a plurality of fabric fibers 430 onto the surface of the adaptable reference body 400 in the jammed configuration. For example, well known fiber processing methods such as melt blowing of non-woven fabrics and/or spun bonding of non-woven fabrics may be used to deposit a layer of fabric fibers 430 onto the surface of the adaptable reference body 400 to eventually form the non-woven fabric 440 by interconnecting the fabric fibers during and/or after being deposited by the fiber depositing apparatus 420.

Figure 4B:
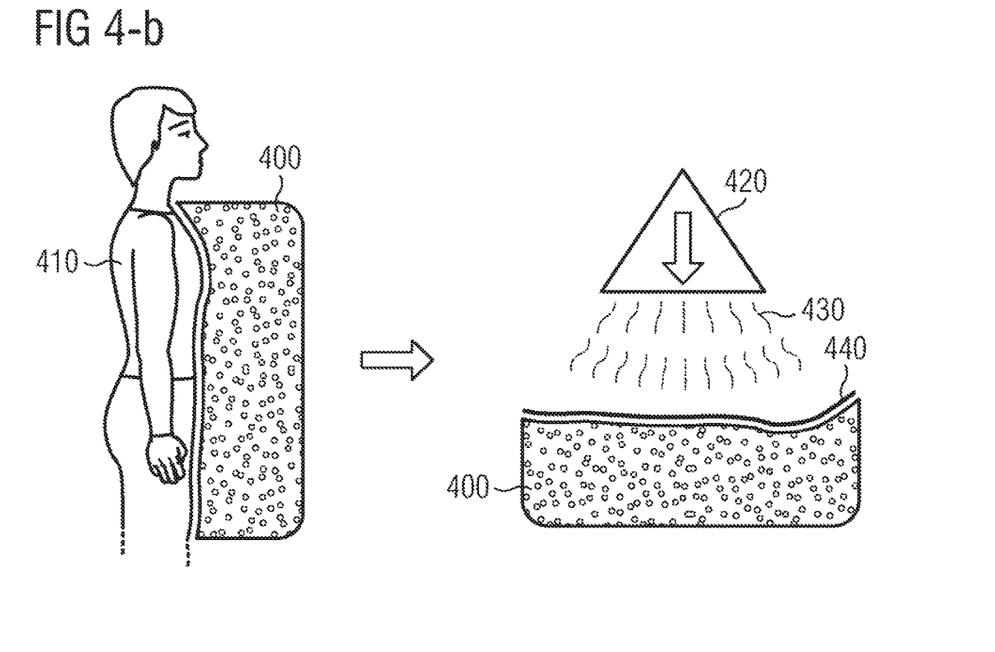
Figure 4C:
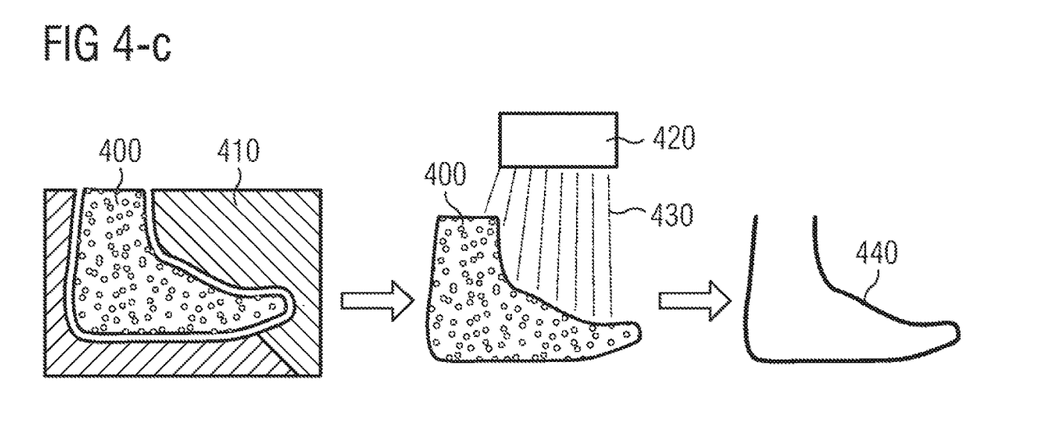

FIGS. 4-b and 4-c illustrate further embodiments of a method for producing non-woven fabrics 440 on the surface of the adaptable reference body 400. In FIG. 4-b, the template body 410 is a human torso, and the adaptable reference body 400 is being used to produce an upper body garment by the method described in detail with reference to FIG. 4-a.

In FIG. 4-c, the adaptable reference body 400 is similar to the adaptable shoe last 200 of FIG. 2. After the non-woven fabric 440 is formed on the surface of the adaptable reference body 400, the particles inside the adaptable reference body 400 may be forced (e.g., by letting in air) to cease jamming and the non-woven fabric 440 may be removed from the adaptable reference body 400.

Naturally, the above discussed method of obtaining a negative relief of a portion of a reference body may be also used for other processing steps different from producing non-woven fabrics.

Figure 5:
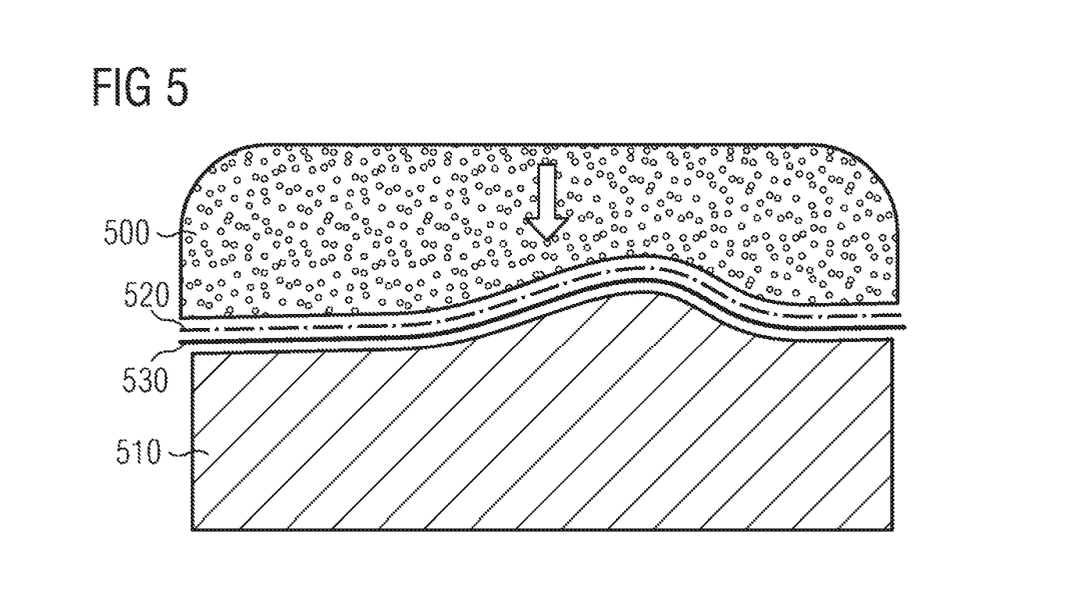
FIG. 5 is a schematic drawing illustrating an application of a particle jamming device as an adaptable compacting device for compression and/or joining two layers of fabric usable during shoe manufacturing according to various embodiments.

FIG. 5 depicts another application of particle jamming devices in footwear manufacture. In one example, a particle jamming device may be used to provide an adaptable compacting device 500 usable for example for compression and/or compacting of a layer of fabric and/or joining two layers of fabric 520, 530 usable during shoe manufacturing.

For instance, during shoe manufacturing it may be necessary to press two layers 520, 530 of fabric onto each other, wherein said pressing is performed on the surface of a template body 510. When said surface exhibits a complex surface structure such as curved protrusions and/or curved recesses, it may be difficult to exert a constant and homogenous pressure onto the two layers of fabric 520, 530 across the extent of the surface of the template body 510.

In order to provide a constant and/or homogeneous compacting pressure across the extent of the surface of the template body 510, an adaptable compacting device 500 may be employed that makes use of the particle jamming effect discussed in detail above with reference to FIGS. 1-4. For instance, the adaptable compacting device 500 may comprise a flexible and/or elastic outer surface forming a cavity filled with a plurality of particles adapted to jam when, for example, the volume of the cavity is reduced. In a first step, the adaptable compacting device 500 may be pressed onto the first layer 520 and/or second layer 530 of fabric in a non-jammed configuration. As a consequence, the outer surface of the adaptable compacting device 500 may start to conform to the surface structure of the template body 510.

In order to exert the desired constant and/or homogeneous compacting pressure onto the two layers of fabric 520, 530, the degree of jamming of the particles inside the adaptable compacting device 500 may be gradually increased and at the same time the adaptable compacting device 500 may be moved further and further in the direction of the template body 510. In this way, the adaptable compacting device 500 first establishes a custom fit to the surface structure of the template body 510. Said custom fit then ensures that, after jamming is induced for the adaptable compacting device 500, the pressure exerted onto the two layers of fabric 520, 530 is essentially constant and/or homogenous across the extent of the relevant surface area of the template body 510.

Figure 6:
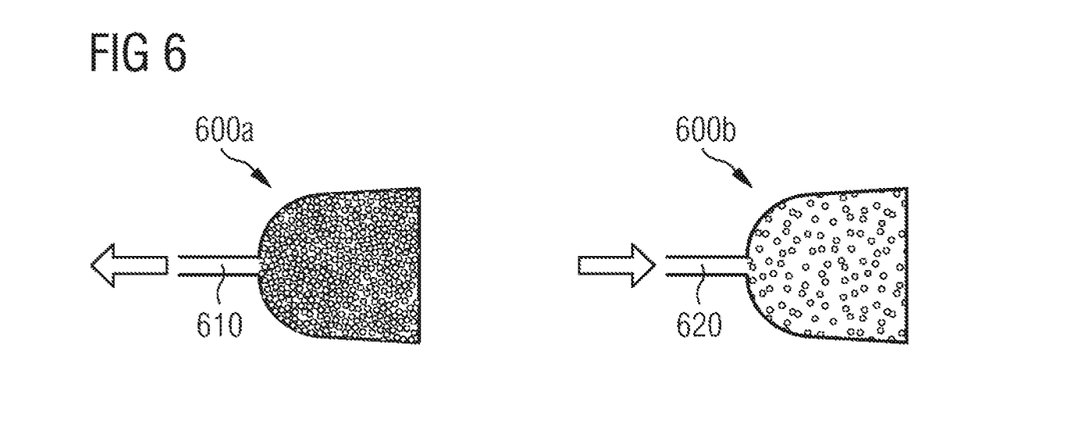
FIG. 6 is a schematic drawing illustrating the use of pressurized air to shorten the time needed for reconfiguring a particle jamming device usable during shoe manufacturing according to various embodiments.

FIG. 6 illustrates how pressurized air or a pressurized process gas may be used to shorten the time needed for reconfiguring a particle jamming device usable during shoe manufacturing. In particular, in order to make use of the particle jamming effect discussed above in detail with reference to FIGS. 1-5, the particles inside a cavity 600*a* of the respective particle jamming device need to be forced to undergo jamming. In some embodiments, said jamming is induced by reducing the volume of the cavity 600*a*, for example, by sucking air/gas out of the cavity through an opening 610 that may be connected to vacuum generation components such as a pump.

When the volume of the cavity 600*a* is reduced below a certain threshold, the particles inside the cavity jam and the particle jamming device is configured in a jammed configuration. As discussed above, various processing steps during shoe manufacturing may benefit from such particle jamming device. However, after a specific manufacturing step involving said particle jamming device is completed, it may be necessary to reconfigure said particle jamming device from the jammed configuration 600*a* into a non-jammed configuration 600*b* such that the respective processing step may be started anew.

In case particle jamming is induced by sucking air out of the cavity 600*a*, said reconfiguration of the particle jamming device may require refilling the cavity 600*b* with essentially the same amount of air that has been sucked out during inducing the particle jamming. The time required for refilling the cavity 600*b* with air may be reduced by actively injecting said amount of air into the cavity 600*b*, for example, by injection of pressurized air through the opening 620. Alternatively, the particle jamming device may be operated not with air but with any kind of process gas suitable and convenient for performing the required volume changes of the cavity 600*a*, 600*b*.

Figure 7:
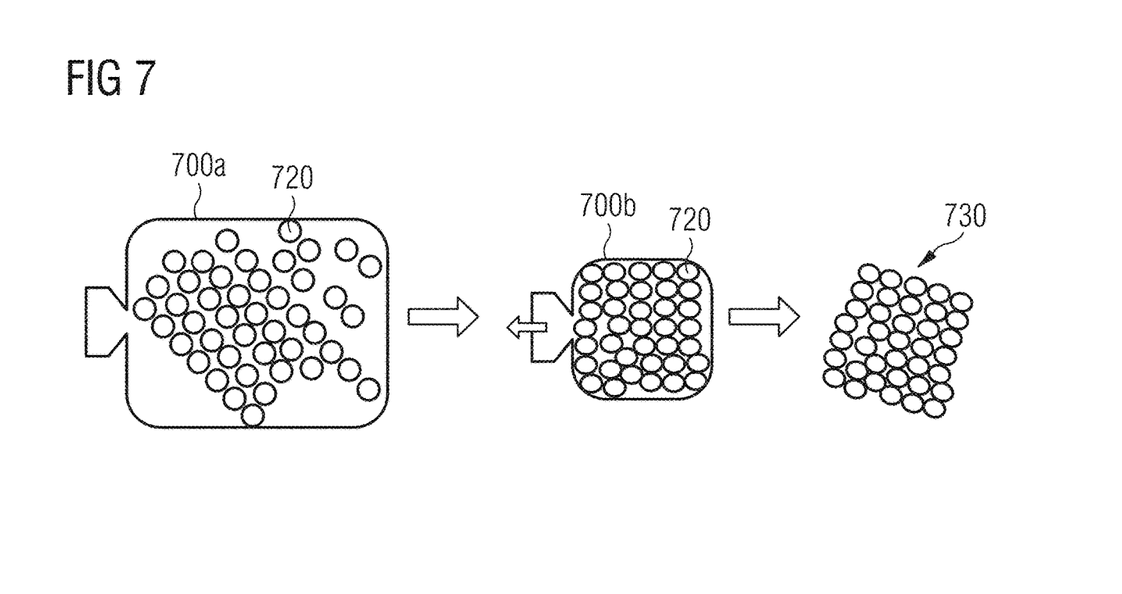
FIG. 7 is a schematic drawing illustrating an application of a particle jamming device as an adaptable mold for forming a particle foam component usable during shoe manufacturing according to various embodiments.

FIG. 7 depicts another application of a particle jamming device for molding of polymer parts, and in particular, shoe components 730. In particular, the particles 720 adapted for jamming inside the cavity formed by the outer surface 700 of the particle jamming device may be the same polymer particles that are also used for forming the shoe component 730.

In order to form the respective shoe component 730, the cavity of the particle jamming device may be filled with a plurality of particles 720 both adapted to jam when the volume of the cavity is reduced and adapted to be permanently connected to form a molded part such as a shoe component 730. When the particle jamming device is still in a non-jammed configuration, the shape, size, and/or geometry of the cavity 700*a* comprising the polymer particles 720 may still be adapted by components and procedures discussed in detail above with reference to FIGS. 1-5. For instance, the shape, size, and/or geometry of the cavity of the particle jamming device may be adjusted by using a controllable pin mold 205 illustrated in FIG. 2.

The particle jamming effect may then be used accordingly to conserve the shape, size, and/or geometry imprinted onto the cavity 700*a* prior to forming the molded part 730. For instance, particle jamming may be induced by reducing the volume of the cavity 700*b* such that the friction forces between the polymer particles 720 inside the cavity 700*b* are sufficiently large. After the shape, size, and/or geometry imprinted on the cavity 700*b* is conserved, the shoe component 730 may be formed by permanently connecting at least partly the surfaces of the polymer particles 720 inside the cavity 700*b*.

For instance, said permanently connecting may be performed by providing heat and/or an adhesive and/or electromagnetic radiation to the particles 720 inside the cavity 700*b*. After the shoe component 730 has been formed, the shoe component 730 may be either released from the cavity provided by the particle jamming device, or the outer surface of the cavity 700*b* may be removed together with the permanently connected polymer particles 720, together forming the molded shoe component 730. Naturally, the combination of particle jamming and particle molding described above may be readily applied to a multitude of different particle types comprising various sizes, shapes, geometries, and materials.

Figure 8:
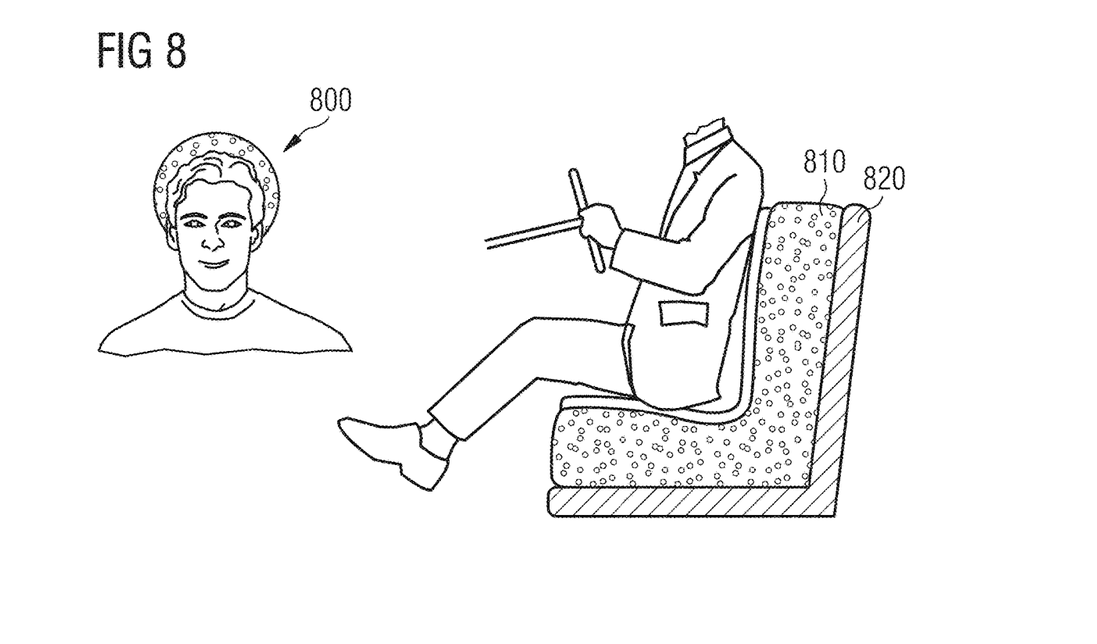
FIG. 8 is a schematic drawing illustrating further applications of particle jamming not exclusively related to apparel manufacturing according to various embodiments.

FIG. 8 illustrates that the unique properties of particle jamming discussed above with reference to certain exemplary embodiments directed to the manufacture of shoes may be readily generalized beyond the art of shoe manufacturing. For example, particle jamming may be used to design custom fit cushioning elements such as protection gear.

For instance, individualized head protection gear—such as helmets 800—may be produced via particle jamming devices similar to the devices discussed in detail with reference to FIGS. 3, 4, and 7. In particular, the helmet 800 may comprise a plurality of jammed particles bordered by an outer surface that custom fits to the size and/or shape of the head of a wearer. The material of the jammed particles may be chosen such that the helmet 800 reliably maintains its individual shape and at the same time provides the necessary cushioning properties for head protection. Naturally other protection gear may be readily designed based on the same principles.

Another example of a cushioning gear based on particle jamming comprises a car seat that comprises a rigid frame structure 820 and a particle jamming portion 810. Said particle jamming portion 810 may be either able to only once be custom fit to the anatomical shape of the driver or be designed to be reconfigurable. For instance, the car seat may further comprise components for repeatedly inducing and releasing the jamming effect inside the particle jamming portion 810 in order to reconfigure the fit of the car seat to the anatomical shape of different drivers.

In the following, further examples are described to facilitate the understanding of the invention:

Example 1

Method for at least partly manufacturing a piece of apparel (100) and in particular a shoe, comprising manipulating at least one component (120) of the piece of apparel (100) with a particle jamming device.

Example 2

Method of Example 1, wherein manipulating the at least one component of the shoe with the particle jamming device comprises at least one of the following steps:
- translating the at least one component of the piece of apparel;
- rotating the at least one component of the piece of apparel;
- holding in place the at least one component of the piece of apparel.

Example 3

Method according to any of the preceding Examples, wherein manipulating the at least one component of the piece of apparel with the particle jamming device comprises at least one of the following steps:
- compressing the at least one component of the piece of apparel;
- deforming the at least one component of the piece of apparel;
- calendaring the at least one component of the piece of apparel.

Example 4

Method according to any of the preceding Examples, wherein manipulating the at least one component of the piece of apparel with the particle jamming device comprises at least one of the following steps:
- molding the at least one component (320) of the piece of apparel;
- forming the at least one component (230) over at least a portion of the surface of the particle jamming device;
- capturing a negative relief of at least a portion of the at least one component 410 of the piece of apparel.

Example 5

Method of Example 4, wherein the step of molding comprises:
- filling a mold volume confined at least in part by a portion (300) of the particle jamming device with a plurality of polymer particles (320); and
- forming the at least one component of the piece of apparel by permanently connecting at least partly the surfaces of the polymer particles (320).

Example 6

Method according to the preceding Example 5, wherein the step of permanently connecting at least partly the surfaces of the polymer particles (320) comprises applying heat and/or an adhesive and/or electromagnetic radiation to the polymer particles (320).

Example 7

Method according to any of the preceding Examples, wherein the at least one component of the piece of apparel is a portion or all of a shoe upper (110), of an insole, of a midsole (120), of a reinforcing element and/or of an outsole.

Example 8

Method according to any of the preceding Examples, wherein the particle jamming device comprises:
- a flexible outer surface (140) forming a cavity,
- wherein the cavity comprises a plurality of particles (150); and
- wherein the plurality of particles (150) is adapted to jam when the volume of the cavity is reduced.

Example 9

Method according to the preceding Example, wherein the flexible outer surface (140) and/or the plurality of particles (150) is heat resistant up to at least a temperature of 200° C.

Example 10

Method according to any of the preceding Examples, wherein the plurality of particles (150) comprises a polymer material, a ceramic material, an organic material, a metal and/or a mineral.

Example 11

Method according to any of the preceding Examples 8-10, wherein the flexible outer surface (140) comprises a polymer, latex, silicone and/or a rubber material.

Example 12

Method according to any of the preceding Examples 8-11, wherein the ratio between the volume of the cavity and the average volume of a particle from the plurality of particles (150) is larger than 20, preferably larger than 50 and most preferably larger than 100.

Example 13

Method according to any of the preceding Examples 8-12, wherein the particles of the plurality of particles (150) have essentially an ellipsoid shape and the average aspect ratio of a particle from the plurality of particles is larger than 1, preferably larger than 1.5 and most preferably larger than 2.

Example 14

System for at least partly manufacturing of a piece of apparel (100), comprising a particle jamming device, wherein the particle jamming device is adapted for manipulating at least one component (120) of the piece of apparel (100).

Example 15

System of Example 14, wherein the system is adapted to perform a method of any of the Examples 1-13.

Example 16

Particle jamming device for the manufacture of a piece of apparel (100), the particle jamming device being adapted to provide at least a portion of a mold (300), of an actuator (130) and/or of a reference body (200, 400) for at least a component of the piece of apparel, wherein the particle jamming device comprises:
- a flexible outer surface (140) forming a cavity,
- wherein the cavity comprises a plurality of particles (150); and wherein the plurality of particles (150) is adapted to jam when the volume of the cavity is reduced.

Example 17

Particle jamming device according to the preceding Example, wherein the flexible outer surface (140) and; or the plurality of particles (150) is heat resistant up to at least a temperature of 200° C.

Example 18

Particle jamming device according to any of the preceding Examples 16 or 17, wherein the plurality of particles (150) comprises a polymer material, a ceramic material, an organic material, a metal and/or a mineral.

Example 19

Particle jamming device according to any of the preceding Examples 16-18, wherein the flexible outer surface (140) comprises a polymer, latex, silicone and/or a rubber material.

Example 20

Particle jamming device according to any of the preceding Examples 16-19, wherein the ratio between the volume of the cavity and the average volume of a particle from the plurality of particles (150) is larger than 20, preferably larger than 50 and most preferably larger than 100.

Example 21

Particle jamming device according to any of the preceding Examples 16-20, wherein the particles of the plurality of particles (150) have essentially an ellipsoid shape and the average aspect ratio of a particle from the plurality of particles is larger than 1, preferably larger than 1.5 and most preferably larger than 2.

Example 22

Particle jamming device according to any of the preceding Examples 16-21, comprising a shoe last (200) as the reference body and/or a particle foam mold (300) for molding soles as the mold and/or an adaptable base plate (130) and/or an adaptive morph pad as the actuator.

Example 23

Method for obtaining a negative relief of an object or surface (410), comprising
at least partly covering the object or surface (410) with at least a portion (400) of a particle jamming device;
wherein the portion (400) of the particle jamming device comprises a flexible outer surface forming a cavity;
wherein the cavity is filled with a plurality of particles adapted to jam when the volume of the cavity is reduced; and
capturing the negative relief of the object or surface (410) by reducing the volume of the cavity.

Example 24

Method for manufacturing a non-woven fabric (440), comprising obtaining a negative relief of an object or surface (410) by the method of Example 23 depositing a plurality of fibers (430) on at least a portion of the surface of the negative relief; and forming the non-woven fabric (440) by connecting at least partly the deposited plurality of fibers.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for at least partly manufacturing a piece of apparel, the method comprising:
moving a robotic actuator arm bearing a component of the piece of apparel toward an adaptive morph pad comprising a particle jamming device having particles within a cavity formed by a flexible outer surface;
operating the robotic actuator arm to press the component against the adaptive morph pad so as to change a configuration of the particles in the cavity into a first configuration conforming with a combined shape defined by the component and a portion of the robotic actuator arm, the portion extending from the component;
jamming the particle jamming device so as to secure the particles in the first configuration and such that the adaptive morph pad is arranged as an individualized support structure at least partially underneath and supporting the component and the portion of the robotic actuator arm extending from the component;
maintaining an engaged state in which the component is engaged with the robotic actuator arm; and
pushing a stamp down against the component with the component in the engaged state with the robotic actuator arm and with the component and the portion of the robotic actuator arm extending from the component supported by the individualized support structure from underneath.

2. The method of claim 1, wherein the pushing the stamp down with the component supported by the individualized support structure from underneath avoids a bending or deformation of the robotic actuator arm.

3. The method of claim 1, wherein the piece of apparel comprises a shoe.

4. The method of claim 1, wherein the component comprises a lasted shoe upper.

5. The method of claim 1, wherein the stamp is pushed down by a printing machine.

6. The method of claim 5, wherein the printing machine is configured to apply a pressing force of up to 2000 N.

7. The method of claim 1, wherein the stamp is pushed down as part of a pad printing process.

8. The method of claim 1, wherein the stamp comprises a silicone stamp.

9. The method of claim 1, wherein the jamming comprises applying a vacuum through gas outlets to an inside of the cavity.

10. The method of claim 1, further comprising:
removing the component from the adaptive morph pad by movement of the robotic actuator arm; and unjamming the particle jamming device to permit relaxing to an original shape and in preparation for a subsequent stamping action with a different component.

11. The method of claim 10, wherein the unjamming comprises switching off a vacuum to permit airflow into an inside of the cavity.

12. The method of claim 1, wherein the component comprises a portion or all of at least one of: a shoe upper, an insole, a midsole, or an outsole.

13. The method of claim 1, wherein the flexible outer surface comprises at least one of a polymer, a latex, a silicone, or a rubber material.

14. The method of claim 1, wherein the particles comprise a plurality of particles that is adapted to jam when a volume of the cavity is reduced.

15. The method of claim 14, wherein a ratio between a volume of the cavity and an average volume of a particle from the plurality of particles is larger than 20.

16. The method of claim 14, wherein the particles of the plurality of particles have essentially an ellipsoid shape and an average aspect ratio of a particle from the plurality of particles is larger than 1.

17. The method of claim 1, wherein the particles comprise at least one of a polymer material, a ceramic material, an organic material, a metal, or a mineral.

18. The method of claim 1, wherein the component is a first component, and wherein the method further comprises:
   unjamming the particle jamming device; and
   pressing a second component against the adaptive morph pad.

19. The method of claim 18, wherein the first component and the second component differ from one another in at least one of last shape, shoe shape, or shoe size.

* * * * *

UNITED STATES PATENT AND TRADEMARK OFFICE
CERTIFICATE OF CORRECTION

| | | |
|---|---|---|
| PATENT NO. | : 11,787,141 B2 | Page 1 of 1 |
| APPLICATION NO. | : 16/518380 | |
| DATED | : October 17, 2023 | |
| INVENTOR(S) | : Henry Hanson et al. | |

It is certified that error appears in the above-identified patent and that said Letters Patent is hereby corrected as shown below:

On the Title Page

Item (54) and in the Specification, Column 1, Lines 1-2, replace "METHOD AND SYSTEM FOR MANUFACTURING A SHOE" with --METHOD FOR MANUFACTURING A SHOE--

Signed and Sealed this
Twenty-eighth Day of May, 2024

Katherine Kelly Vidal
*Director of the United States Patent and Trademark Office*